US009085921B2

(12) United States Patent
Pellegrini et al.

(10) Patent No.: US 9,085,921 B2
(45) Date of Patent: Jul. 21, 2015

(54) UNLOCKING DEVICE

(75) Inventors: Andreas Pellegrini, Wabern (DE); Lars Linnenkohl, Staufenberg (DE); Andreas Schunke, Hardegsen (DE)

(73) Assignee: GEBR. BODE GMBH & CO. KG (DE)

( * ) Notice: Subject to any disclaimer, the term of this patent is extended or adjusted under 35 U.S.C. 154(b) by 0 days.

(21) Appl. No.: 13/500,340

(22) PCT Filed: May 5, 2010

(86) PCT No.: PCT/EP2010/056106

§ 371 (c)(1), (2), (4) Date: May 22, 2012

(87) PCT Pub. No.: WO2011/042220

PCT Pub. Date: Apr. 14, 2011

(65) Prior Publication Data

US 2012/0235426 A1 Sep. 20, 2012

(30) Foreign Application Priority Data

Oct. 9, 2009 (DE) ........................ 10 2009 048 983

(51) Int. Cl.
*F16H 53/00* (2006.01)
*E05B 85/00* (2014.01)
*E05B 81/14* (2014.01)

(52) U.S. Cl.
CPC ................ *E05B 85/01* (2013.01); *E05B 81/14* (2013.01)

(58) Field of Classification Search
USPC ............... 292/166, 177, 57.6, 62, 251.5, 201, 292/144, 1, 140, 197; 74/567–569
See application file for complete search history.

(56) References Cited

U.S. PATENT DOCUMENTS 2,844,677 A * 7/1958 Hanssen ........................ 200/466
2,915,161 A * 12/1959 Branscomb ................... 192/149
2,957,357 A * 10/1960 Stockwell ......................... 74/55

(Continued)

FOREIGN PATENT DOCUMENTS

DE 19933366 A1 2/2000
EP 0828049 A2 3/1998

(Continued)

OTHER PUBLICATIONS

International Search Report; International Application No. PCT/EP2010/056106; Dated Dec. 16, 2010; Mail date Dec. 16, 2010.

*Primary Examiner* — Kristina Fulton
*Assistant Examiner* — Thomas Neubauer
(74) *Attorney, Agent, or Firm* — Cantor Colburn LLP

(57) ABSTRACT

The invention relates to an unlatching device (20) for public transportation vehicles, comprising a deflection rocker (4) connected to a first rotatable shaft (6), said deflection rock being connected by means of a connecting element (5), to an unlocking element of a lock and being provided with a projecting driving pin (11), and further comprising an actuating lever (8), which is mounted on the first shaft (6) and rotatable about the first shaft (6), and a cam wheel (1) connected to a second rotatable shaft (7), said cam wheel meshing with the deflection rocker (4). A rotation of the cam wheel (1) causes a pivoting of the deflection rocker (4), and thus a movement of the connecting element (5) and unlocking of the lock. Rotating the actuating lever (8) causes the actuating lever (8) to come in contact with the driving pin (11), and to catch said driving pin and during further rotation also the deflection rocker (4), whereby the connecting element (5) is moved and the lock unlocked.

15 Claims, 7 Drawing Sheets

(56) References Cited

U.S. PATENT DOCUMENTS

Figure 1:
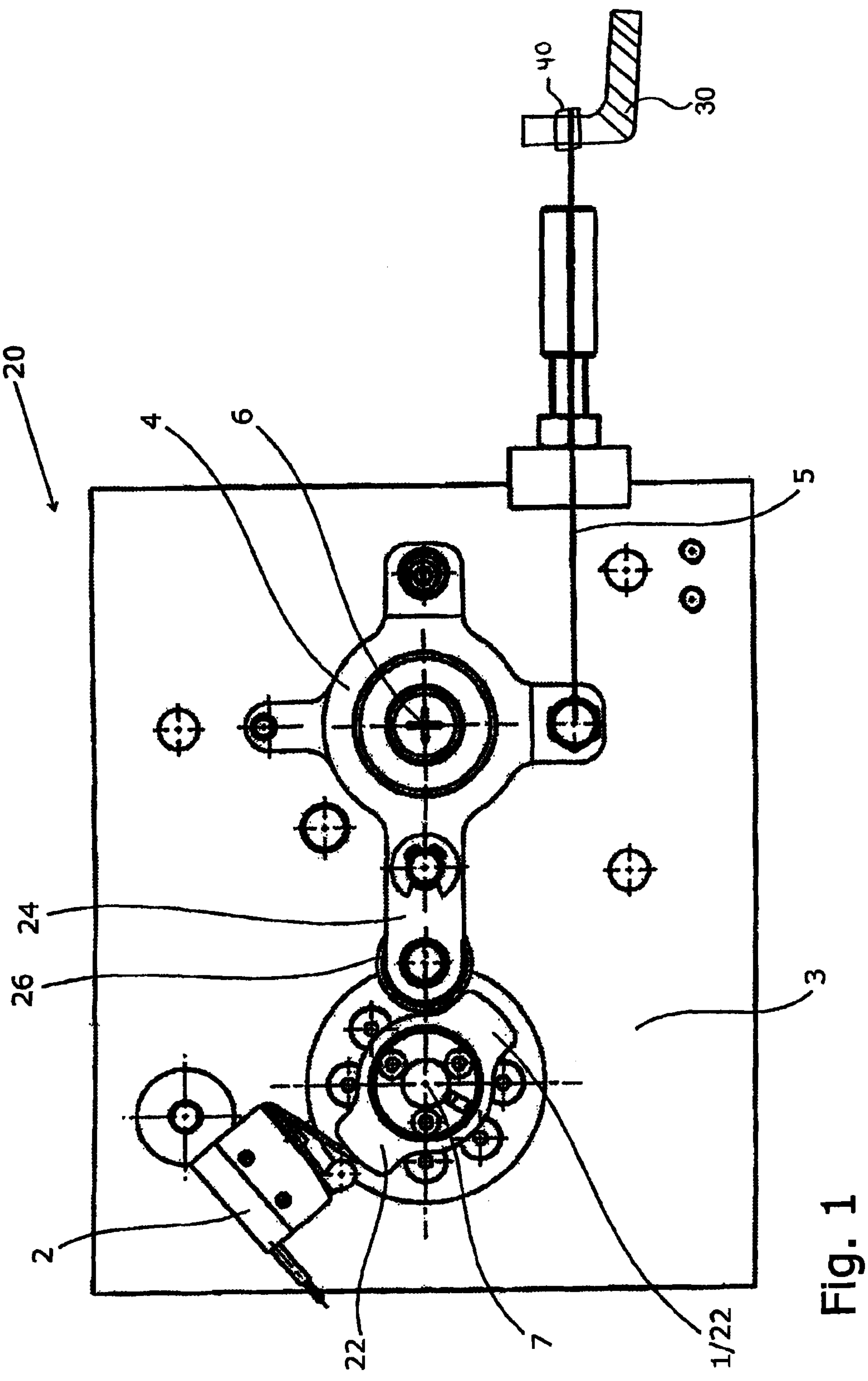

| | | | | |
|---|---|---|---|---|
| 3,971,581 | A * | 7/1976 | Montgomery ............. | 292/251.5 |
| 5,823,026 | A * | 10/1998 | Finke .............................. | 70/276 |
| 2010/0188177 | A1 * | 7/2010 | Inage ............................ | 335/205 |

FOREIGN PATENT DOCUMENTS

| | | | | | |
|---|---|---|---|---|---|
| EP | 1083282 | A2 | | 3/2001 | |
| EP | 1293368 | A2 | | 3/2003 | |
| FR | 2715688 | | * | 8/1995 | .............. E05B 65/02 |

* cited by examiner

UNLOCKING DEVICE

TECHNICAL FIELD

The present invention relates to an unlocking device for public transport vehicles.

BRIEF DISCUSSION OF RELATED ART

Generally, public transport vehicles have a number of doors, for example, sliding doors, pivoting doors or pivot sliding doors. It is crucial that the doors can be, on the one hand, securely locked, but, on the other hand, can also be quickly and easily unlocked. Rotary-latch locks for example, which securely lock the doors during travel, are suitable for this purpose. These door locks can be quickly and easily unlocked in the case of an intended stop or also in case of an emergency stop.

For example EP 1293368 shows a device for opening and closing a rotating sliding door for motor vehicles. A pulley is connected via two Bowden cables with two rotary locks disposed on a portal column. The pulley can be activated through a lifting magnet. On the whole, the construction of the device is complex; the device requires a relatively large amount of construction space and consists of a multitude of components.

BRIEF SUMMARY

The invention provides an unlocking device for public transport vehicles that is as compact and simply constructed as possible.

According to the invention, a generic unlocking device is provided, comprising:

- a deflection rocker, which is connected to a first rotatable shaft and is connected through a connecting member with an unlocking member of a lock, and comprises a protruding driving pin,
- an actuating lever which is supported on the first shaft and rotatable about the first shaft,
- a cam wheel which is connected to a second rotatable shaft and intermeshes with the deflection rocker, wherein,

- a rotation of the cam wheel causes the deflection rocker to pivot, and thus the connecting member to move and the lock to be unlocked,
- by rotating the actuating lever, the actuating lever comes into contact with the driving pin, driving the driving pin and thus, the deflection rocker during further rotation, whereby the connecting member is moved and the lock unlocked.

Thus, the unlocking device according to the invention substantially comprises two intermeshing elements, namely the deflection rocker and the cam wheel. For example, both can be supported on a base plate on one shaft, respectively. Advantageously, the cam wheel is driven by a motor, for example and electric gear motor.

Due to the fact that the two elements intermesh, a rotation of the cam wheel leads to the deflection rocker being driven and also set into rotation. A Bowden cable attached to the deflection rocker is moved by the rotational movement of the deflection rocker and unlocks the lock, preferably a rotary-latch lock. A different connecting member, for example a push rod, may also be used instead of the Bowden cable, with the rotation of the deflection rocker in that case pushing the push rod and the latter unlocking the lock. Furthermore, several locks can be unlocked simultaneously by the connecting member.

In a particularly advantageous embodiment, a position detecting device is provided which detects the position of the cam wheel. This can then be transmitted through a suitable electronic system to the driver of the vehicle, so that he is informed at all times of the current position or setting of the unlocking device.

The cam wheel can comprise two diametrically opposite cams that cooperate with a lever arm disposed on the deflection rocker in such a way that the lever arm is driven once by a rotation of the cam wheel over 180° and thus the deflection rocker is actuated once. A spring member causes the deflection rocker to be returned to its initial position after actuation.

In order to enable an actuation of the unlocking device that is as quiet and low-wear as possible, the lever arm intermeshing with the cam wheel has on its end a rotatably supported elements which rolls on the corresponding cam when the cam wheel rotates.

In order to enable an emergency release in addition to the operational opening processes, an actuating lever that is supported so as to be rotatable about the first shaft is preferably provided on the first shaft. This can be disposed, for example, above or below the deflection rocker. In order to move the actuating lever, this is preferably connected to a manually activated emergency wheel. Upon rotation of the emergency wheel, the actuating lever thus rotates until it drives the deflection rocker through the driving pin and thus actuates the connecting member or Bowden cable, which then releases the lock.

Preferably, another pull and/or push member may be hinged to the actuating lever, through which the actuating lever can also be rotated. Thus, an emergency release is possible, on the one hand, through the emergency wheel, and on the other hand through the further pull and/or push member.

Another external emergency release that actuates the deflection rocker through the Bowden cable comprises only a shaft and an actuating lever with an emergency wheel placed thereon.

The emergency wheel can also be configured to be electrically driven; a combination of a manual and electrical drive is also conceivable. The actuating lever and the driving pin are to be understood to be only first exemplary embodiments for contacting and triggering the emergency release; they can also be replaced with similarly acting elements.

The actuating lever has a defined neutral stroke, and thus has to travel a certain distance until it contacts the driving pin. This is a result of the fact that the stroke distance of the Bowden cable and thus the required rotation of the deflection rocker for unlocking the lock are generally considerably smaller than the required rotation of the actuating lever or the emergency wheel, which in an advantageous embodiment must be at least 90°.

The actuating lever can also be returned to the initial position through a spring member, e.g. through torsion springs.

Switching elements that detect the actuation and/or the position of the emergency release can be provided for monitoring the unlocking device.

In order to prevent the actuation of the emergency release during travel, it may be necessary to block the emergency release device. For this purpose, a vehicle in public transport often provides a signal during travel (3 kph signal) which can be processed in the unlocking device directly or through a control unit.

In a particularly advantageous embodiment, an electrically acting blocking system is provided on the base plate or on the underside of the base plate. Due to the arrangement in the area of the base plate, the entire unlocking device has a small and compact design.

If the blocking device is provided on the underside of the base plate, the base plate has a slot through which the driving pin extends. A blocking arm into which a curved track is incorporated in which the driving pin is guided is rotatably mounted on the underside of the base plate. Thus, the blocking arm is driven during every movement of the deflection rocker.

Moreover, the blocking arm has a magnetically acting magnet surface. If the emergency release is not actuated during travel, the magnet surface of the blocking arm rests on an electrical magnetic clamp also disposed on the base plate. If the magnetic clamp is supplied with electric power, e.g. triggered by the 3 kph signal, the blocking arm and thus the deflection rocker cannot be moved any more. The blocking action is disabled by switching off the power supply of the magnetic clamp.

It is possible, by selection of the magnetic clamp, to influence the blocking force. An effective protection against vandalism or a panic opening of the door, for example, can thus be enabled. Furthermore, the use of magnetic clamps has the great advantage that very high adhesion forces can be generated already with low power consumption.

A guiding pin which is also firmly connected to the base plate can extend into another guide track of the blocking arm. The guide track causes the blocking arm to be guided and, depending on the length of the guide track, end stops for the guiding pin, and thus also end stops for the deflection rocker, are provided.

In another advantageous embodiment, it is alternatively possible to block the emergency release pneumatically. For this purpose, the pneumatic cylinder is also connected to the base plate and, depending on the actuation, blocks the direction of movement of the deflection rocker. For this purpose, the pneumatic cylinder is preferably configured with a return spring and is controlled through a valve, which is in turn actuated directly by the 3 kph signal.

BRIEF DESCRIPTION OF THE DRAWIGNS

Figure 2:
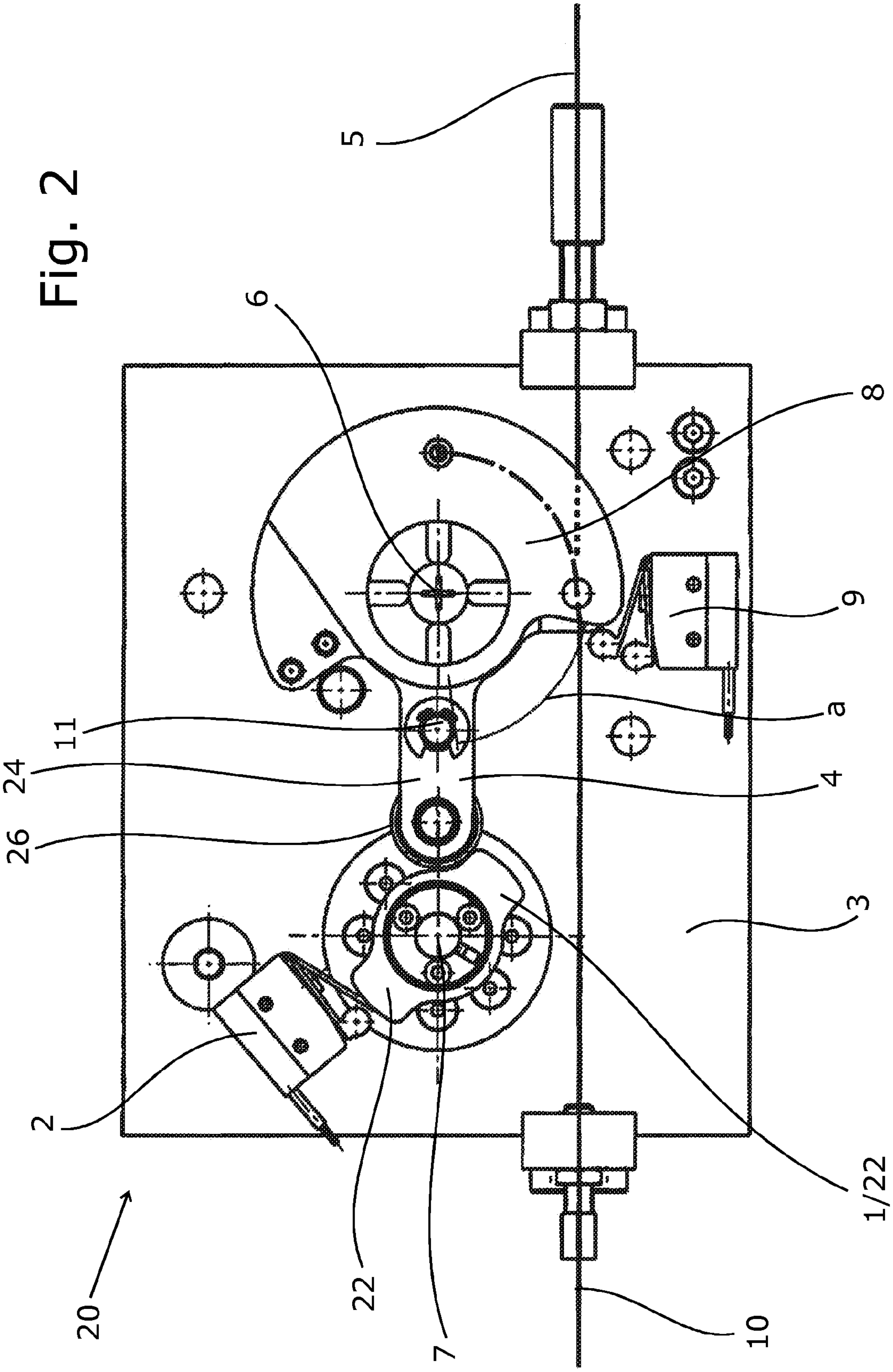

The invention is explained in more detail with reference to the following figures. These are to be understood to be mere exemplary embodiments; the invention is not limited to the functions and features shown. In the figures:

FIG. 1: shows a top view of an unlocking device according to the invention,

FIG. 2: shows the unlocking device from FIG. 1 with an emergency wheel placed thereon, and with a switching element in the case where the emergency release has not been actuated, FIG. 3: shows the unlocking device according to FIG. 2 with actuated emergency release, FIG. 4: shows a side view of the unlocking device from the FIGS. 2 and 3, FIG. 5: shows a second embodiment of the unlocking device according to the invention, with a view from below onto a base plate, with a non-actuated emergency release, FIG. 6: shows the unlocking device according to FIG. 5 with actuated emergency release, FIG. 7: shows another unlocking device according to the invention with a pneumatic blocking system.

DETAILED DESCRIPTION

FIGS. 1 to 4 illustrate the structure of a first unlocking device 20 according to the invention.

A cam wheel 1 and a deflection rocker 4 are disposed on a base plate 3, with the deflection rocker 4 being rotatably supported on a first shaft 6 and the cam wheel 1 on a second shaft 7.

In the exemplary embodiment shown, the cam wheel 1 is driven by an electric gear motor 13 disposed on the opposite side of the base plate 3. A position detecting device for detecting the position of the cam wheel 1 is realized by a switch 2 that, on the end face, contacts diametrically opposite cams 22 of the cam wheel 1.

The cam wheel 1 intermeshes with the deflection rocker 4, in particular with a lever arm 24 molded thereon. The lever arm 24, on the free end thereof intermeshing with the cam wheel 1, comprises a rotatable roller 26 that rolls on the respective cam 22 of the cam wheel 1.

A connecting member 5 which is pulled upon rotation of the deflection rocker 4 and actuates or unlocks a lock 30 and is connected through the connecting member 5 with an unlocking member 40 of the lock 30, is hinged to the deflection rocker 4. The connecting member 5 is preferably configured as a Bowden cable.

In order to ensure an emergency release, an actuating lever 8 which is rotatable about the first shaft 6 is disposed on the first shaft 6. The deflection rocker 4 or the lever arm 24, in the side view according to FIG. 4, has a perpendicularly protruding driving pin 11 which, upon rotation of the actuating lever 8, is contacted by it and can be driven by it. In turn, the actuating lever 8 is firmly connected to an emergency wheel 12 and can be rotated by means of it.

Rotating the actuating lever 8 is also possible through a further pulling member 10 which is also hinged to the actuating lever 8.

In the exemplary embodiment shown, the actuating lever 8 is configured as a partial disc but can also be configured as a protruding lever corresponding to the lever arm 24.

FIG. 2 shows an unlocking device 20 in the home position in which the emergency release is not actuated.

Figure 3:
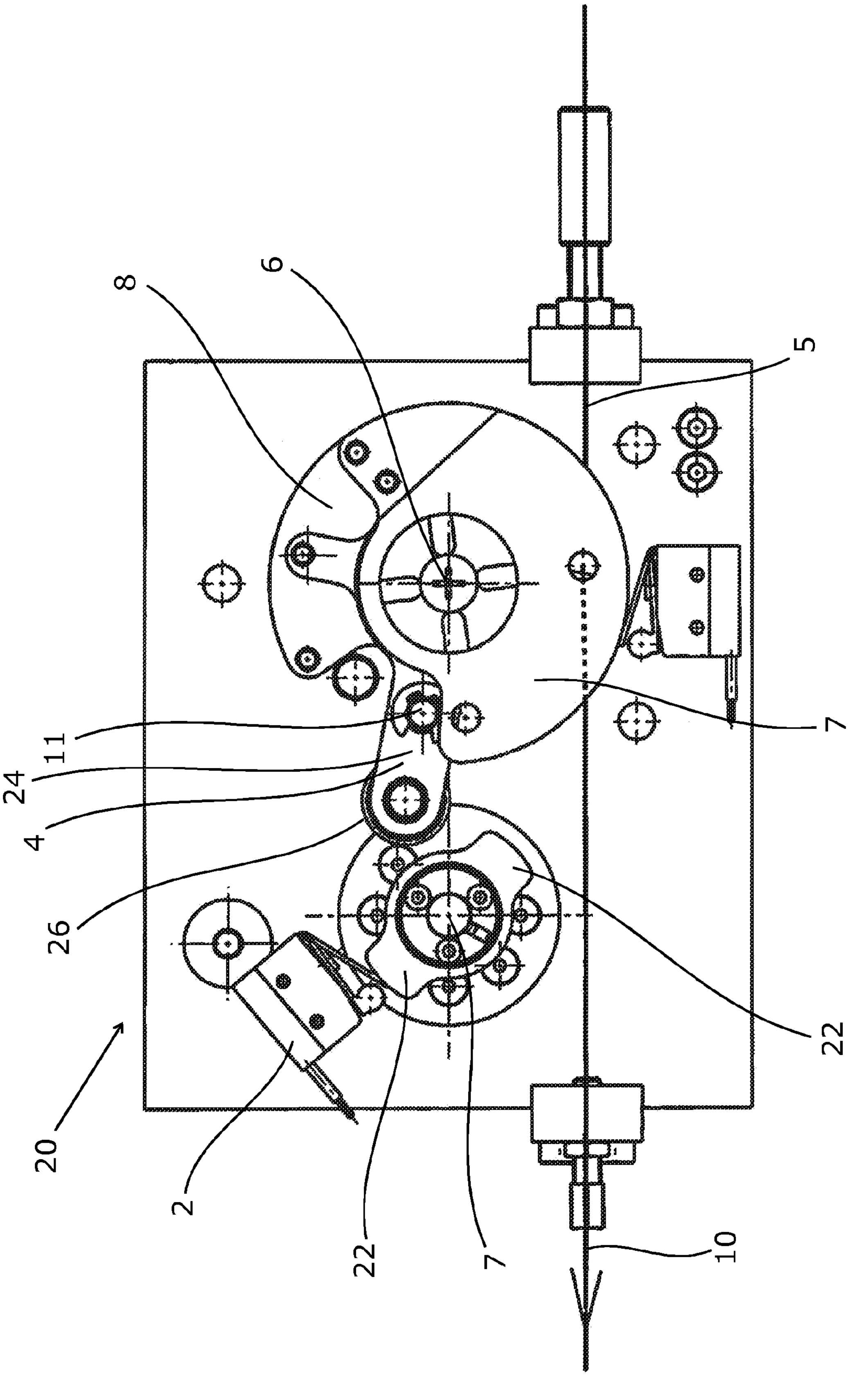
Figure 4:
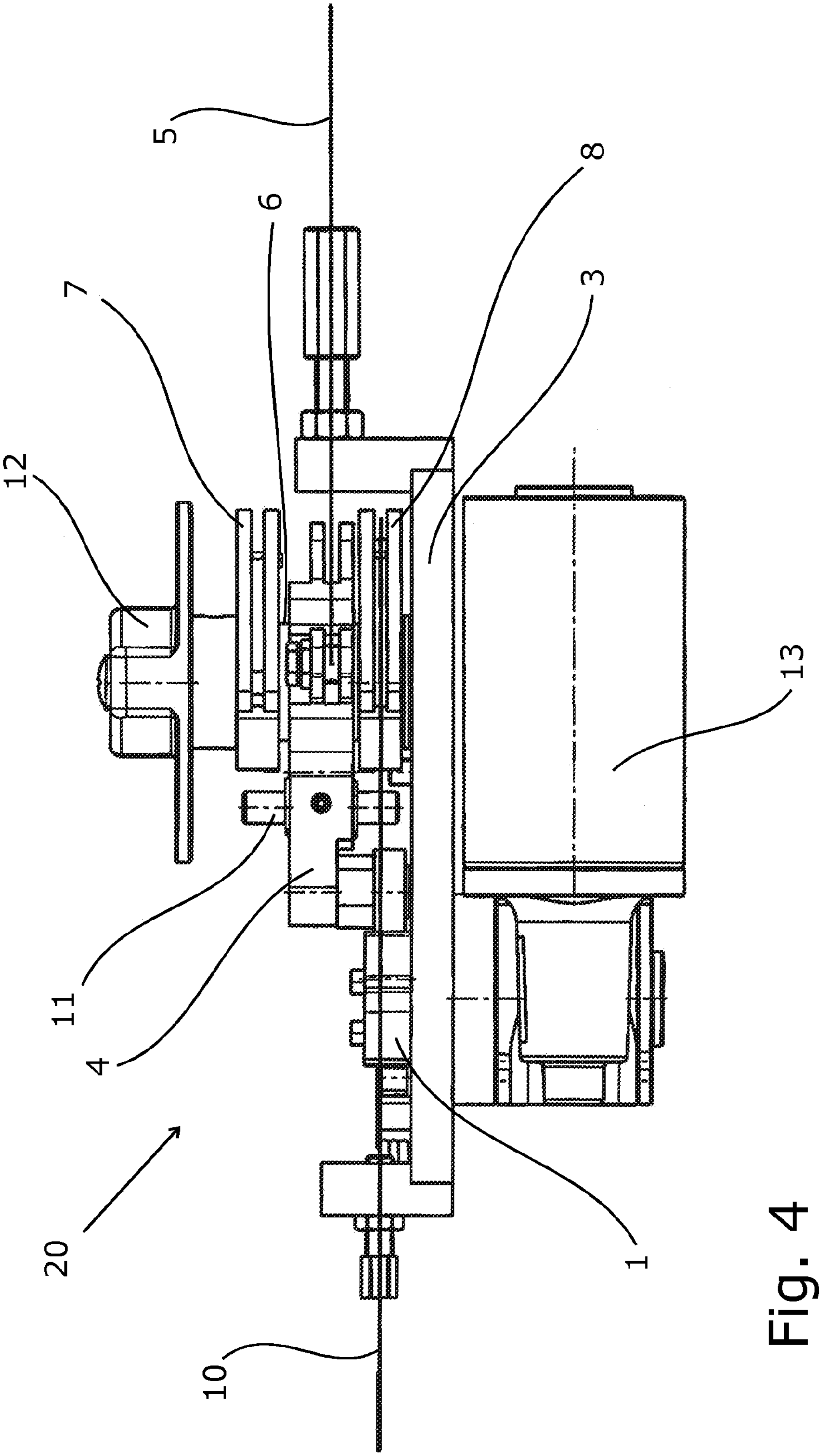

FIG. 3 shows the unlocking device 20 according to the invention with actuated emergency release. It can be seen that the lever arm 24 has moved away from the cam wheel 1, which was caused by the driving pin 11 being contacted by the actuating lever 8 and a subsequent further rotation. The connecting member 5 is also moved and the lock, which is not shown, unlocked by the rotation of the deflection rocker. Spring members, which are not shown, can cause an automatic return of the deflection rocker 4 and/or the actuating lever 8. Torsion springs, for example, are suitable for this purpose.

It can moreover be seen in FIGS. 2 and 3 that a neutral stroke of the actuating lever 8, i.e. the distance that the actuating lever has to travel until contact with the driving pin 11, at 90° is considerably greater than the stroke distance of the connecting member 5 required for unlocking the lock. In other words, a rotation of the emergency wheel 12 by about 90° is required before the emergency release is triggered; in contrast, the deflection rocker 4 has to be rotated only by less than 30° in order to unlock the lock.

Figure 5:
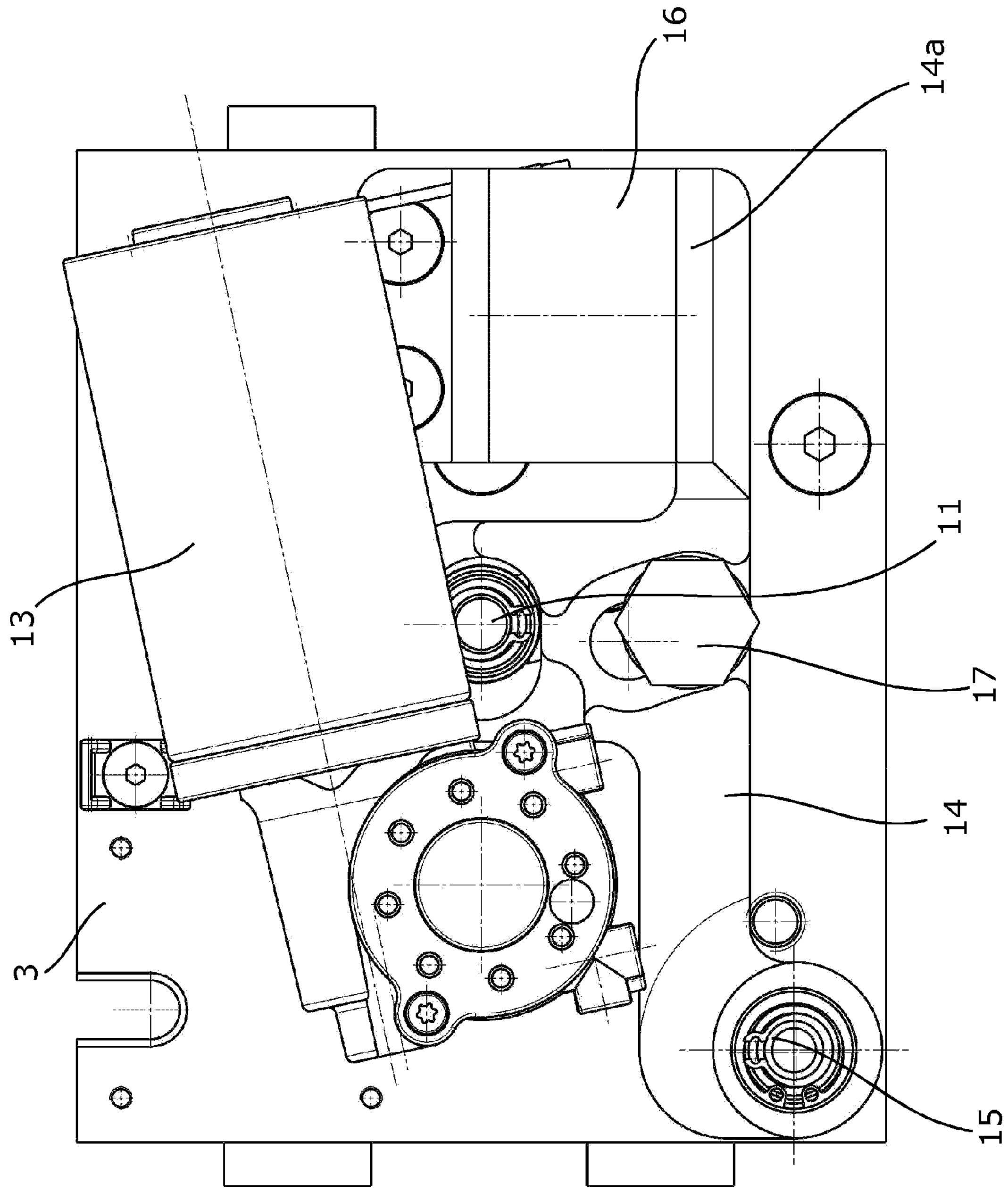
Figure 6:
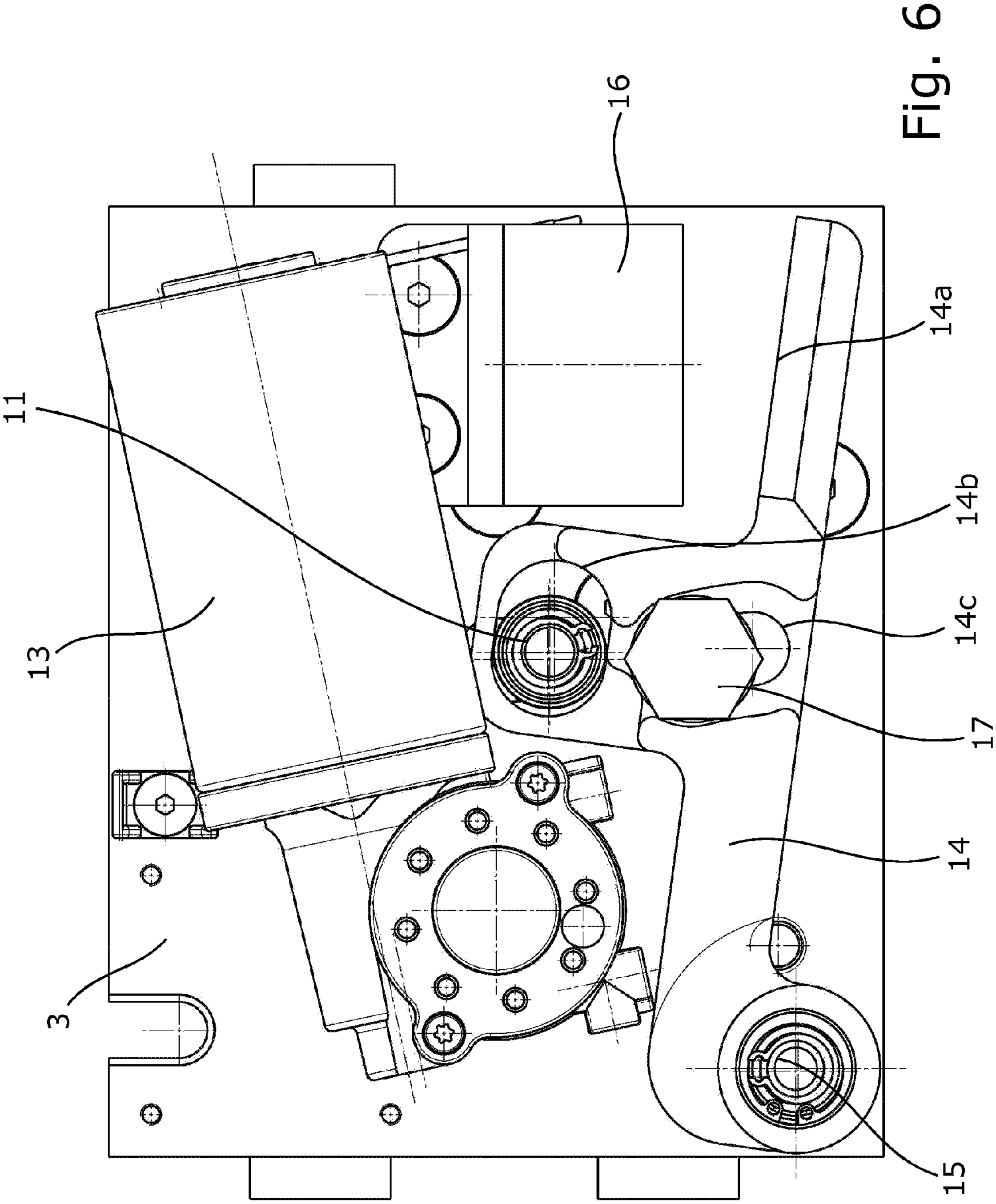

FIGS. 5 and 6 show the unlocking device 20 from below, i.e. with a view onto the side of the base plate 3 opposite from the cam wheel 1 and the deflection rocker 4. The driving pin 11 is guided through a slit in the base plate 3. A blocking arm 14 is rotatably supported on the base plate 3 through a bearing 15. The blocking arm 14 has a curved track 14*b* in which the driving pin 11 is guided. Thus, the blocking arm 14 is driven during every movement of the deflection rocker 4. If the emergency release is not actuated, for example during travel, a magnet surface 14*a* integrated into the blocking arm 14 rests on a magnetic clamp 16 also attached to the base plate 3. If the clamp is supplied with electric power, the blocking arm 14, and thus the deflection rocker 4, cannot be moved anymore (see FIG. 5).

However, if the magnetic force is canceled, the blocking arm 14 can be moved and the blocking action thus canceled (see FIG. 6). Thus, the magnetic clamp 16 serves as a fixing device for the blocking arm 14.

Furthermore, a pin 17 is advantageously provided which is firmly connected to the base plate 3 and extends into another guide track 14*c* of the blocking arm 14. The pin 17 and the guide track 14*c* act as end stops and guide for the blocking arm 14, and thus also as end stops for the deflection rocker 4.

Figure 7:
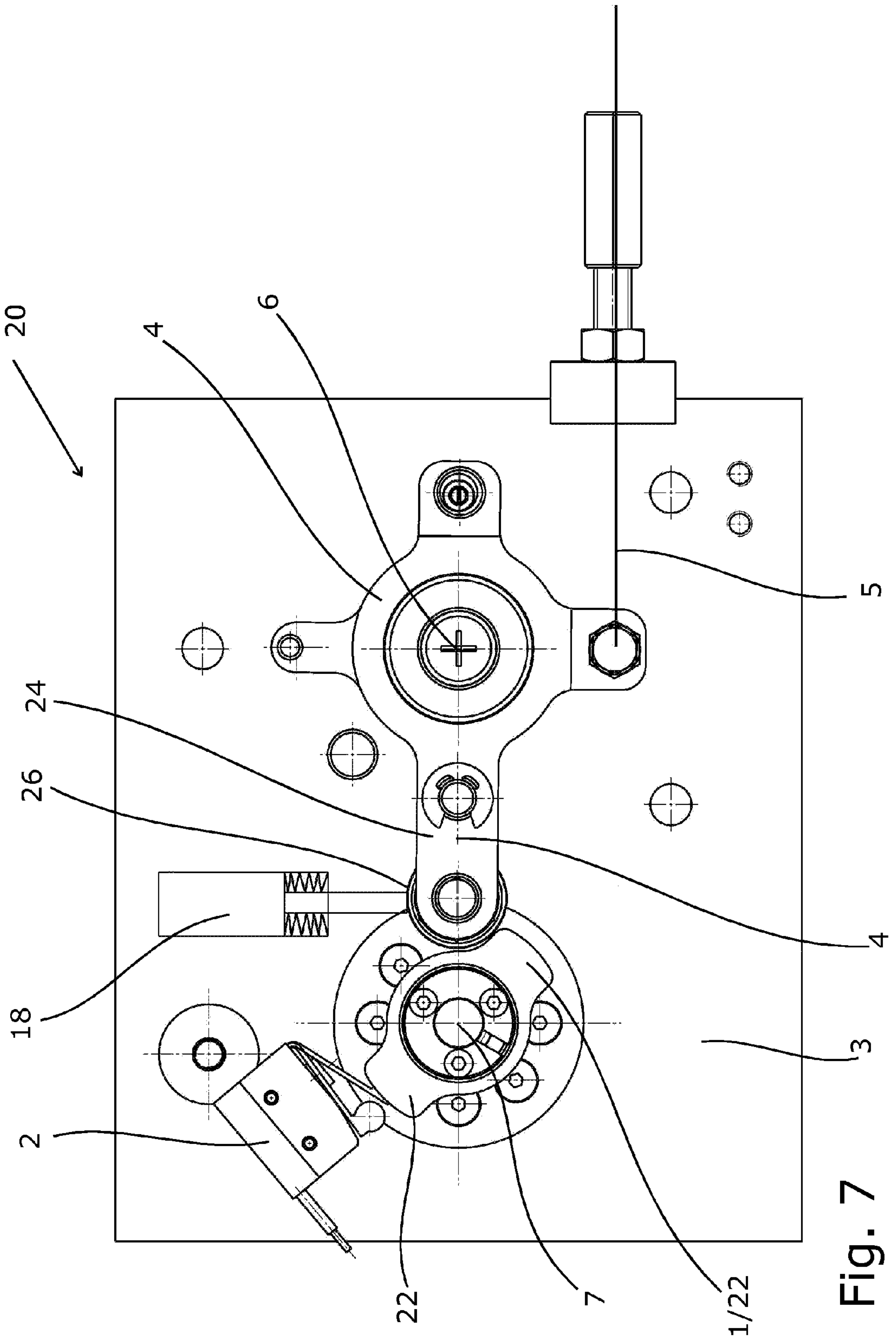

FIG. 7 shows an alternative blocking device for the unlocking device 20 according to the invention. A pneumatic cylinder 18 also arranged on the base plate 3 is disposed in such a way that it is able to bar the movement of the deflection rocker 4. Advantageously, the pneumatic cylinder comprises a return spring 19 and is controlled through a valve which is not shown, and which is actuated, for example, by the 3 kph signal.

The invention is not limited to the exemplary embodiments shown, but also extends to equivalent modifications of the technical components.

The invention claimed is:

1. Unlocking device for public transport vehicles, comprising:

- a deflection rocker, which is connected to a first rotatable shaft and is connected through a connecting member with an unlocking member of a lock, and comprises a protruding driving pin,
- an actuating lever which is supported on the first shaft and rotatable about the first shaft,
- a cam wheel which is connected to a second rotatable shaft and intermeshes with the deflection rocker,
- wherein a rotation of the cam wheel causes the deflection rocker to pivot, and thus the connecting member to move and the lock to be unlocked, and
- wherein by rotating the actuating lever, the actuating lever comes into contact with the driving pin, driving the driving pin and thus the deflection rocker during further rotation, whereby the connecting member is moved and the lock unlocked,
- wherein the deflection rocker is pivoted by rotation of the cam wheel and independently from the cam wheel by rotating the actuating lever.

2. Unlocking device according to claim 1, wherein the cam wheel is electrically driven.

3. Unlocking device according to claim 1, wherein the cam wheel comprises two diametrically opposite cams that intermesh with a lever arm disposed on the deflection rocker and cooperate therewith in such a way that the lever arm is driven once by a rotation of the cam wheel over 180° and thus the deflection rocker is actuated.

4. Unlocking device according to claim 1, wherein the actuating lever is connected to and rotated by an emergency wheel.

5. Unlocking device according to claim 1, wherein a pull and/or push member is hinged to the actuating lever, through which the actuating lever can be rotated.

6. Unlocking device according to claim 1, wherein the deflection rocker is connected to a spring member which returns it to an initial position after actuation.

7. Unlocking device according to claim 1, wherein the actuating lever and the driving pin are arranged in such a way that a neutral stroke has to be overcome before the actuating lever and the driving pin come into contact.

8. Unlocking device according to claim 7, wherein the neutral stroke exceeds a stroke distance of the connecting member required for unlocking the lock.

9. Unlocking device according to claim 1, further comprising a position detecting device detecting the position of the cam wheel.

10. Unlocking device according to claim 1, further comprising an additionally activatable blocking device blocking a movement of the deflection rocker.

11. Unlocking device according to claim 10, wherein the blocking device is formed by a rotatable blocking arm which contacts the driving pin and, in the non-actuated state of the blocking device, follows the movements of the driving pin, wherein the blocking arm can be fixed in a position by means of a fixing device, whereby movement of the blocking arm and movement of the driving pin are blocked.

12. Unlocking device according to claim 11, wherein the fixing device is formed by an electrically controllable magnetic clamp.

13. Unlocking device according to claim 10, wherein the blocking device is formed by a pneumatic cylinder which acts on the deflection rocker and blocks the deflection rocker in the actuated state.

14. Unlocking device according to claim 13, wherein the pneumatic cylinder is equipped with a return spring which returns the pneumatic cylinder from the blocking position into the home position.

15. Unlocking device according to claim 10, wherein the blocking device is activated through a signal that is generated dependent on a speed of the vehicle.

* * * * *